US009110863B2

(12) United States Patent
Law et al.

(10) Patent No.: US 9,110,863 B2
(45) Date of Patent: Aug. 18, 2015

(54) SEAMLESS SWITCHING OF USB DEVICES CONNECTED TO A MONITOR HUB

(71) Applicant: Dell Products, LP, Round Rock, TX (US)

(72) Inventors: Boon Kiat Law, Singapore (SG); Siew Fei Lee, Singapore (SG); Shohrab Sheikh, Singapore (SG)

(73) Assignee: Dell Products, LP, Round Rock, TX (US)

( * ) Notice: Subject to any disclaimer, the term of this patent is extended or adjusted under 35 U.S.C. 154(b) by 0 days.

(21) Appl. No.: 14/057,602

(22) Filed: Oct. 18, 2013

(65) Prior Publication Data

US 2015/0113181 A1  Apr. 23, 2015

(51) Int. Cl.
*G06F 13/20* (2006.01)
*H04W 92/00* (2009.01)
*G06F 13/12* (2006.01)
*G09G 5/00* (2006.01)

(52) U.S. Cl.
CPC .............. *G06F 13/20* (2013.01); *G06F 13/12* (2013.01); *G09G 5/003* (2013.01); *H04W 92/00* (2013.01); *G09G 2370/24* (2013.01)

(58) Field of Classification Search
CPC ....... G06F 13/12; G06F 3/038; G06F 3/0227; G09G 5/006; G09G 5/003
See application file for complete search history.

(56) References Cited

U.S. PATENT DOCUMENTS

| | | | |
|---|---|---|---|
| 8,311,209 B2 | 11/2012 | Ibrahim et al. | |
| 8,505,038 B2 | 8/2013 | Lakshmanan et al. | |
| 2002/0059638 A1 | 5/2002 | Oz et al. | |
| 2003/0182439 A1 | 9/2003 | Geshwind | |
| 2004/0133668 A1 | 7/2004 | Nicholas, III | |
| 2006/0090013 A1 | 4/2006 | Achacoso et al. | |
| 2007/0022234 A1* | 1/2007 | Yang | 710/62 |
| 2008/0016188 A1 | 1/2008 | Batni et al. | |
| 2008/0222326 A1* | 9/2008 | Liu et al. | 710/62 |
| 2009/0249421 A1 | 10/2009 | Liu et al. | |
| 2010/0060571 A1* | 3/2010 | Chen et al. | 345/157 |
| 2010/0161445 A1 | 6/2010 | Revell et al. | |
| 2010/0180055 A1* | 7/2010 | Lyon et al. | 710/62 |
| 2011/0053582 A1 | 3/2011 | Mueck et al. | |
| 2013/0227472 A1* | 8/2013 | Sosinski | 715/794 |
| 2013/0346562 A1* | 12/2013 | Kim | 709/219 |

* cited by examiner

*Primary Examiner* — Chun-Kuan Lee
*Assistant Examiner* — Ronald Modo
(74) *Attorney, Agent, or Firm* — Larson Newman, LLP

(57) ABSTRACT

A monitor for an information handling system includes a video interface operable to receive first display content, a wireless interface operable to receive second display content, a first Universal Serial Bus (USB) interface, and a second USB interface. The monitor is operable to receive a first indication to display the first content and in response to receiving the first indication, to display the first content and couple the first USB interface to the second USB interface. The monitor is further operable to receive a second indication to display the second content and in response to receiving the second indication, to display the second content and couple the wireless interface to the second USB interface.

17 Claims, 10 Drawing Sheets

SEAMLESS SWITCHING OF USB DEVICES CONNECTED TO A MONITOR HUB

FIELD OF THE DISCLOSURE

This disclosure generally relates to information handling systems, and more particularly relates to switching of USB devices connected to a monitor hub in an information handling system.

BACKGROUND

As the value and use of information continues to increase, individuals and businesses seek additional ways to process and store information. One option is an information handling system. An information handling system generally processes, compiles, stores, and/or communicates information or data for business, personal, or other purposes. Because technology and information handling needs and requirements may vary between different applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software resources that may be configured to process, store, and communicate information and may include one or more computer systems, data storage systems, and networking systems. An information handling system can perform various logging functions to track the operating status of the information handling system. An information handling system can include a monitor for displaying content of the information handling system. A monitor can include a Universal Serial Bus (USB) hub for connecting USB devices to the information handling system.

BRIEF DESCRIPTION OF THE DRAWINGS

It will be appreciated that for simplicity and clarity of illustration, elements illustrated in the Figures have not necessarily been drawn to scale. For example, the dimensions of some of the elements are exaggerated relative to other elements. Embodiments incorporating teachings of the present disclosure are shown and described with respect to the drawings presented herein, in which.

The use of the same reference symbols in different drawings indicates similar or identical items.

DETAILED DESCRIPTION OF DRAWINGS

The following description in combination with the Figures is provided to assist in understanding the teachings disclosed herein. The following discussion will focus on specific implementations and embodiments of the teachings. This focus is provided to assist in describing the teachings, and should not be interpreted as a limitation on the scope or applicability of the teachings. However, other teachings can certainly be used in this application. The teachings can also be used in other applications, and with several different types of architectures, such as distributed computing architectures, client/server architectures, or middleware server architectures and associated resources.

For purpose of this disclosure an information handling system can be implemented on one or more information handling system. An information handling system can include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, entertainment, or other purposes. For example, an information handling system can be a personal computer, a laptop computer, a smart phone, a tablet device or other consumer electronic device, a network server, a network storage device, a switch, a router, or another network communication device, or any other suitable device and may vary in size, shape, performance, functionality, and price. Further, an information handling system can include processing resources for executing machine-executable code, such as a central processing unit (CPU), a programmable logic array (PLA), an embedded device such as a System-on-a-Chip (SoC), or other control logic hardware. An information handling system can also include one or more computer-readable medium for storing machine-executable code, such as software or data. Additional components of an information handling system can include one or more storage devices that can store machine-executable code, one or more communications ports for communicating with external devices, and various input and output (I/O) devices, such as a keyboard, a mouse, and a video display. An information handling system can also include one or more buses operable to transmit information between the various hardware components.

Figure 1:
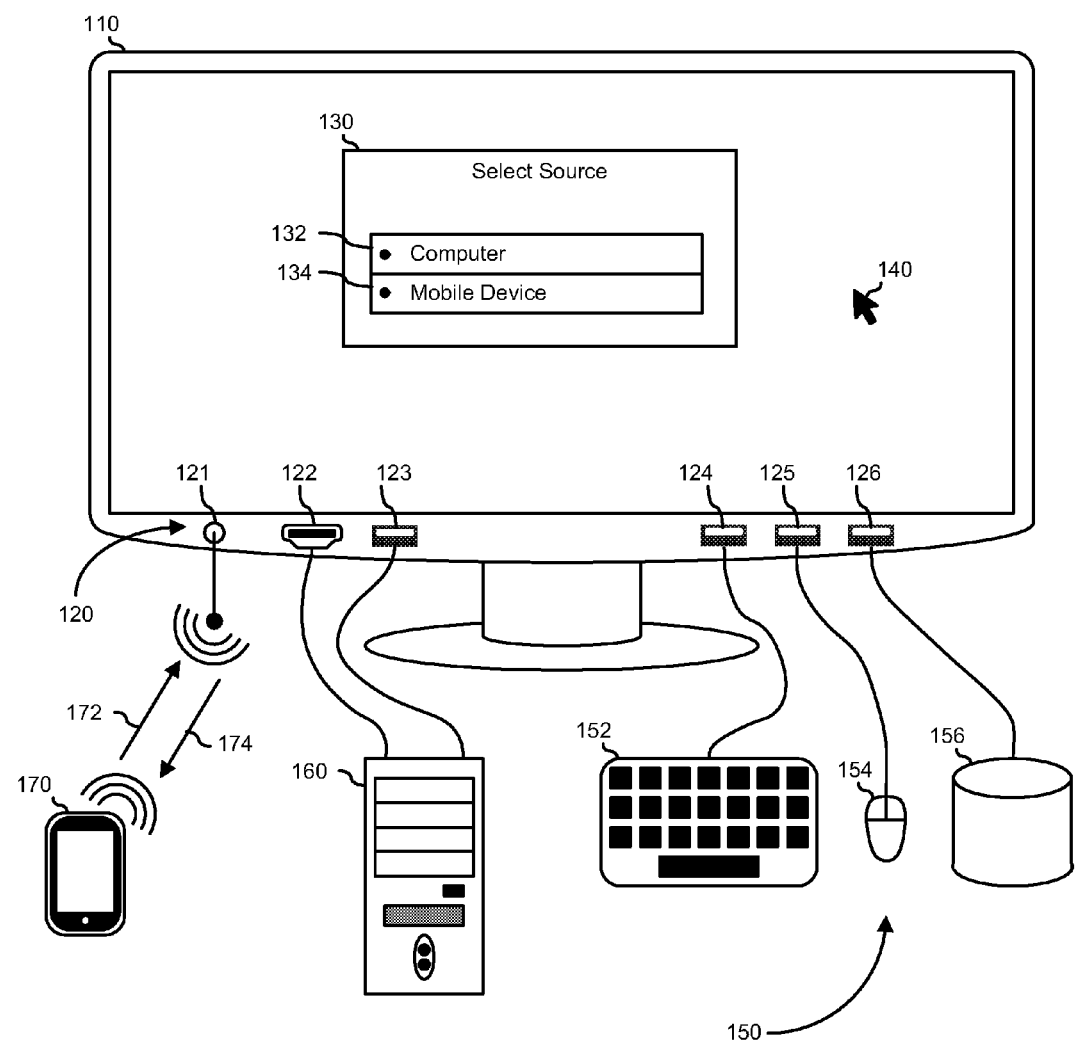
FIG. 1 is a block diagram illustrating a monitor system according to an embodiment of the present disclosure.

FIG. 1 illustrates an embodiment of a monitor system 100 including a monitor 110, USB peripheral devices 150, a computer system 160, and a mobile device 160. USB peripheral devices 150 include a keyboard 152, a mouse 154, and a storage device 156. Monitor 110 includes various interfaces 120, including a wireless interface 121, a video interface 122, and USB interfaces 123, 124, 125, and 126. Video interface 122 represents an audio/video interface for transferring video content from a host system such as computer system 160 for display on monitor 110, that can include a High Definition Multimedia Interface (HDMI), a Digital Video Interface (DVI), a DisplayPort interface, a Digital Interface for Video and Audio (DIVA) interface, another audio/video interface, or a combination thereof. In a particular embodiment, monitor 110 includes one or more additional video interfaces similar to video interface 122. Here computer system 160 can include any information handling system that is connected to monitor 110 via a wired video interface and an additional data interface such as USB interface 123, as described below, and can include a personal computer system, a laptop computer system, or another information handling system, as needed or desired.

Wireless interface 121 represents a peer-to-peer wireless network interface for transferring video content from a wireless device such as wireless device 170 for display on monitor 110, that can include a wireless interface that is in compliance with a Wi-Fi Direct standard, and can include Wireless Display (WiDi) enabled wireless features, Miracast enabled wireless features, other wireless features, or a combination thereof. In a particular embodiment, monitor 110 includes one or more additional wireless interfaces similar to wireless interface 121. Wireless interface 121 is connected to establish a high capacity connection 172 to monitor 110 for transferring the video content, and a backchannel connection 174 from the monitor for receiving information from the monitor. Here mobile device 170 can include any information handling system that is connected to monitor 110 via a wireless interface, and can include a smart phone, a tablet device, or another wireless mobile device, as needed or desired.

USB interface 123 is connected to computer system 160 to transfer information between monitor 110 and the computer system. USB interface 124 is connected to keyboard 152 to provide a keyboard-based human interface device (HID) for a selected one of computer system 160 or mobile device 170, as described below. USB interface 125 is connected to mouse 154 to provide a pointer-based HID for a selected one of computer system 160 or mobile device 170, as described below. USB interface 126 is connected to storage device 156 to provide a data storage capacity for a selected one of computer system 160 or mobile device 170, as described below. In a particular embodiment, monitor 110 operates to connect the various USB devices together with the functionality of a USB hub to expand a single USB interface into several USB interfaces, thereby permitting additional devices to be connected to a single system. In this embodiment, USB interface 123 operates as an upstream USB port that is connected to computer system 160 and USB interfaces 124, 125, and 126 operate as downstream ports to connect keyboard 152, mouse 154, and storage device 156, respectively, to the computer system.

In another embodiment, monitor 110 operates to select between a mode for the display of content from mobile device 170 and a mode for the display of content from computer system 160. Here, an on-screen display function of monitor 110 operates to provide a user input field 130 that permits a user to select, for example by manipulating a pointer 140, between a computer selection field 132, and a mobile device selection field 134. The skilled artisan will recognize that the method of selecting between the mobile device mode and the computer system mode described above is illustrative of a wide range of methods for making such a selection. For example, monitor 110 can include a touch panel feature, and a user can select between computer selection field 132 and mobile device selection field 134 by touching an area of the touch panel that corresponds with the selected field. In another example, a hot key sequence can be associated with keyboard 152 that operates to select one of the computer system mode or the mobile device mode. The skilled artisan will further understand that the teachings of the present disclosure can be applied to multiple input devices to monitor 110, and is not limited to computer system 160 and mobile device 170.

Figure 2:
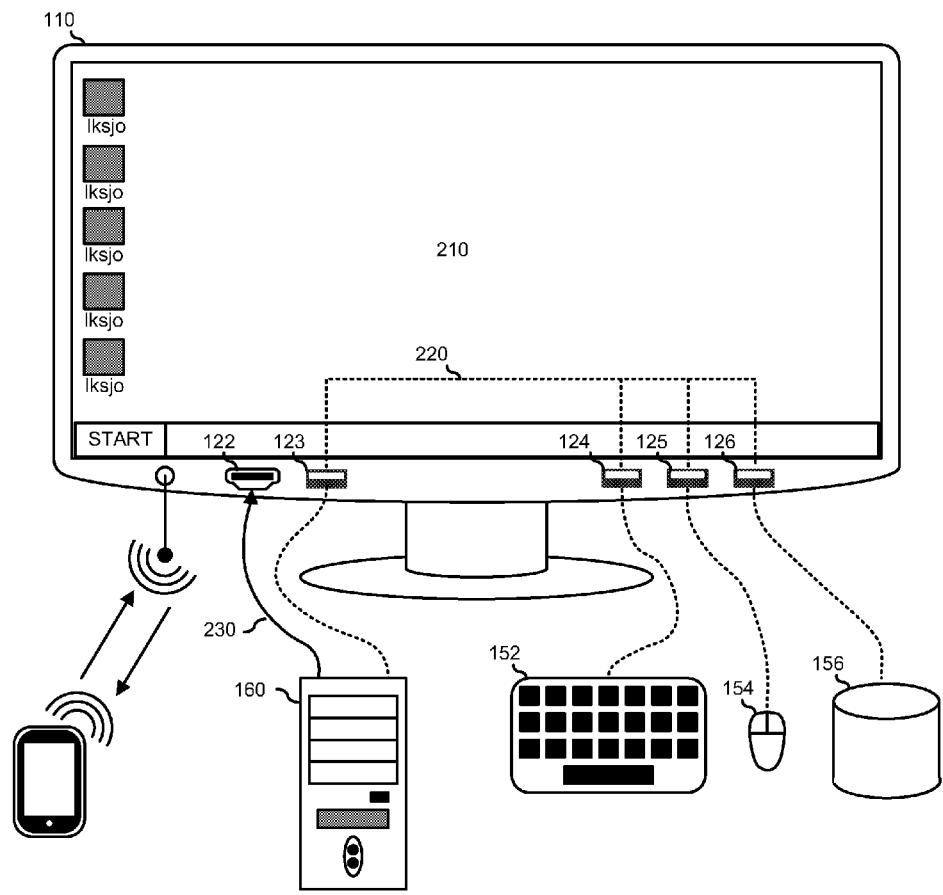
FIGS. 2-4 are block diagrams illustrating embodiments of the monitor system of FIG. 1.

FIG. 2 illustrates a case for monitor system 100 where a user has selected the computer system mode, for example, by moving pointer 140 to select computer selection field 132. Here, in response to the user selection, monitor 110 displays content 210 from computer system 160. Content 210 is provided from computer system 160 via an audio/video connection 230 between video interface 122 and computer system 160. Here, when the user selects the computer system mode, monitor 110 operates to automatically connect keyboard 152, mouse 154, and storage device 156 to computer system 160, as illustrated by an interconnection 220. In this way, computer system 160 receives the HID functions of keyboard 152 and mouse 154, and has access to the data storage capacity of storage device 156, all via USB interface 123.

Figure 3:
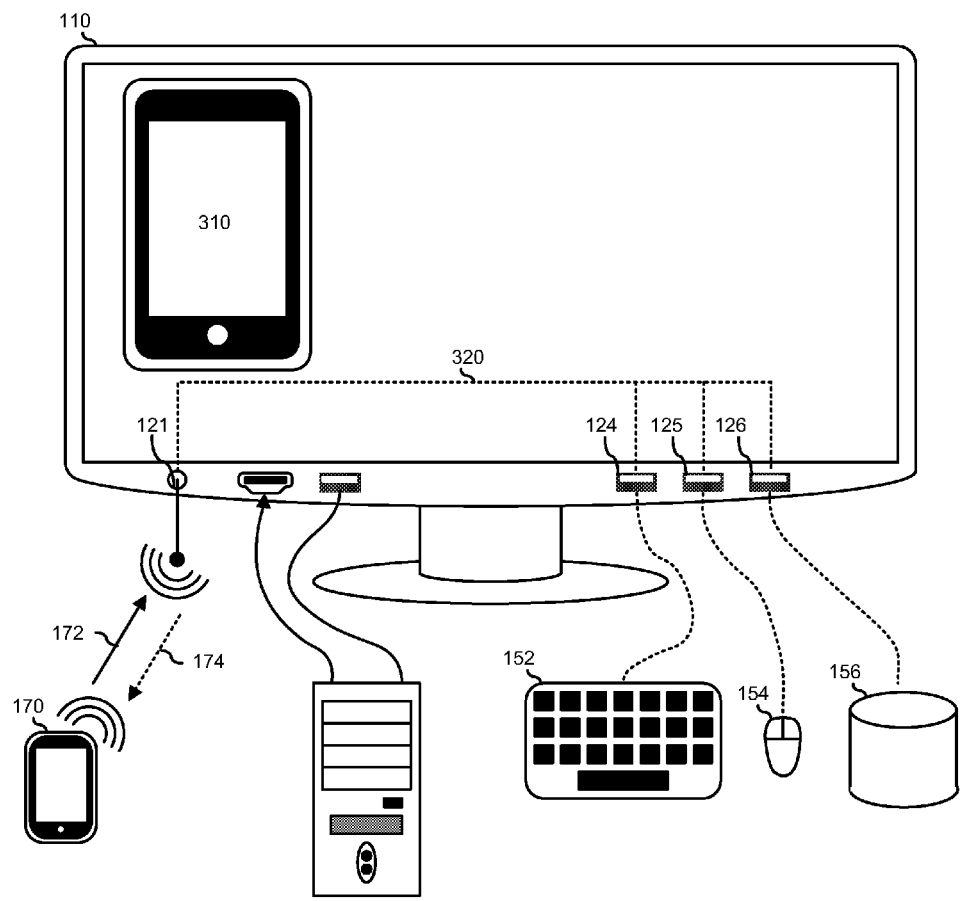

FIG. 3 illustrates a case for monitor system 100 where the user has selected the mobile device mode, for example, by moving pointer 140 to select mobile device selection field 134. Here, in response to the user selection, monitor 110 displays content 310 from mobile device 170. Content 310 is provided from mobile device 170 via high capacity connection 172 between wireless interface 121. Here, when the user selects the mobile device mode, monitor 110 operates to automatically connect keyboard 152, mouse 154, and storage device 156 to mobile device 170, as illustrated by an interconnection 320. In this way, mobile device 170 receives the HID functions of keyboard 152 and mouse 154, and has access to the data storage capacity of storage device 156, all via backchannel connection 174.

Figure 4:
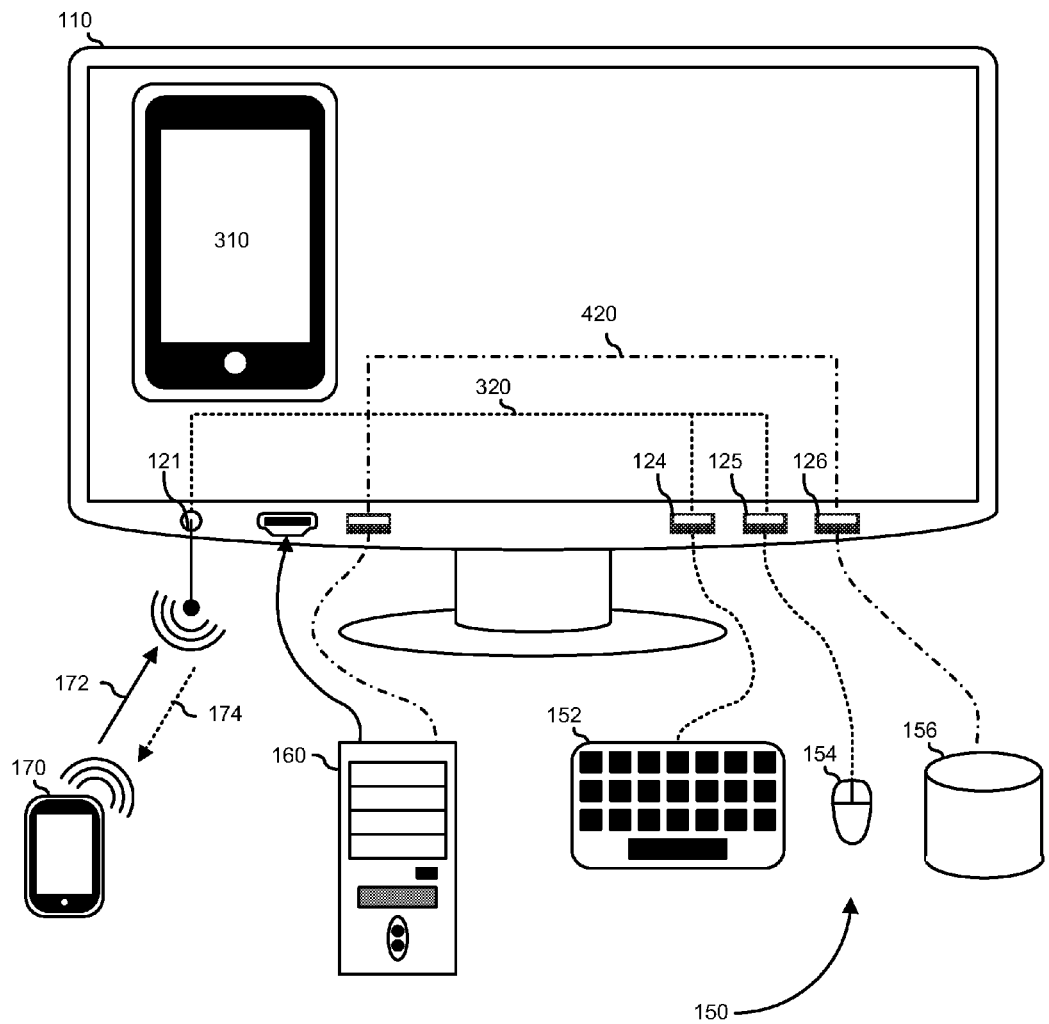

FIG. 4 illustrates an embodiment of monitor system 100 where the functionality of one or more of USB peripheral devices 150 is dedicated to the use of one of computer system 160 or mobile device 170, without regard to the mode selected by the user. Here, for example, in the case where the user has selected the mobile device mode, the HID functions of keyboard 152 and mouse 154 are provided to mobile device 170 via backchannel connection 174, but the data storage capacity of storage device 156 remains dedicated to computer system 160. The functionality of the selected USB peripheral device 150 can be dedicated to the use of the one of computer system 160 or mobile device 170 via a selection option of the USB function of monitor 110, or by another method as known in the art.

Figure 5:
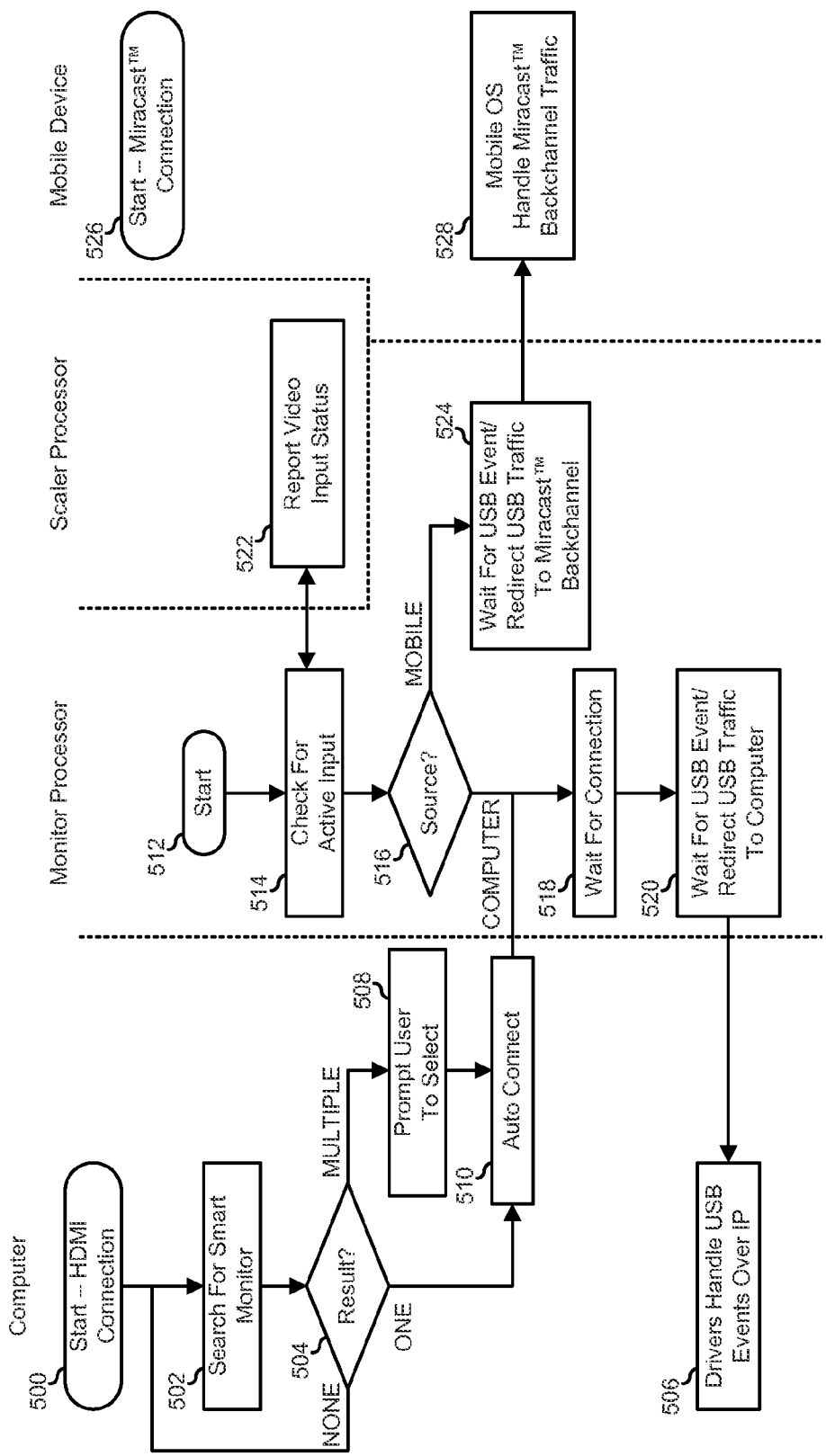
FIG. 5 is a flowchart illustrating a method for seamless switching of USB devices connected to the monitor system of FIG. 1.

FIG. 5 illustrates a method for seamless switching of USB devices in a monitor system similar to monitor system 100. The method is conducted by a computer system similar to computer system 160, a monitor similar to monitor 110 and including a monitor processor and a scaler processor, and a mobile device similar to mobile device 170. The method starts in the computer system at block 500. The computer system searches for an attached smart monitor in block 502. In a particular embodiment, the computer system determines if an attached monitor is a smart monitor by receiving extended display identification data (EDID) information from the attached monitor, and the computer system determines the capabilities of the attached monitor based upon the received EDID information. A decision is made as to whether none, one, or multiple monitors are attached to the computer system in decision block 504. If no monitors are attached to the computer system, the "NONE" branch of decision block 504 is taken and the method returns to block 502 where the computer system searches for an attached smart monitor. If one monitor is attached to the computer system, the "ONE" branch of decision block 504 is taken, the computer system is auto-connected to the one monitor in block 510, and the method proceeds to the steps conducted by the monitor. If multiple monitors are attached to the computer system, the "MULTIPLE" branch of decision block 504 is taken, a user is prompted as to which monitor to attach to the computer system in block 508, the computer system is auto-connected to the one monitor in block 510, and the method proceeds to the steps conducted by the monitor.

The method starts in the mobile device at block 526, where the mobile device establishes a wireless connection to the monitor, such as a WiDi connection or a Miracast connection. The method starts in the monitor at block 512. The monitor processor checks the scaler processor for active input to the monitor in block 514, and waits for a report of the video input status from the scaler processor in block 522. When the active input is received by the monitor processor in block 514, a decision is made as to which source is selected by the video input status from the scaler processor in decision block 516. If the computer system is selected, the "COMPUTER" branch of decision block 516 is taken, the monitor processor waits for the computer system to be connected to the monitor in block 518, the monitor processor waits for a USB event and redirects the USB event to the computer in block 520, and the device drivers of the computer system handles the USB event over the USB connection between the monitor and the computer system in block 506. If the mobile device is selected, the "MOBILE" branch of decision block 516 is taken, the monitor processor waits for a USB event and redirects the USB event to the mobile device in block 524, and the mobile OS of the mobile device handles the USB event over the Miracast backchannel or other wireless backchannel in block 528.

Figure 6:
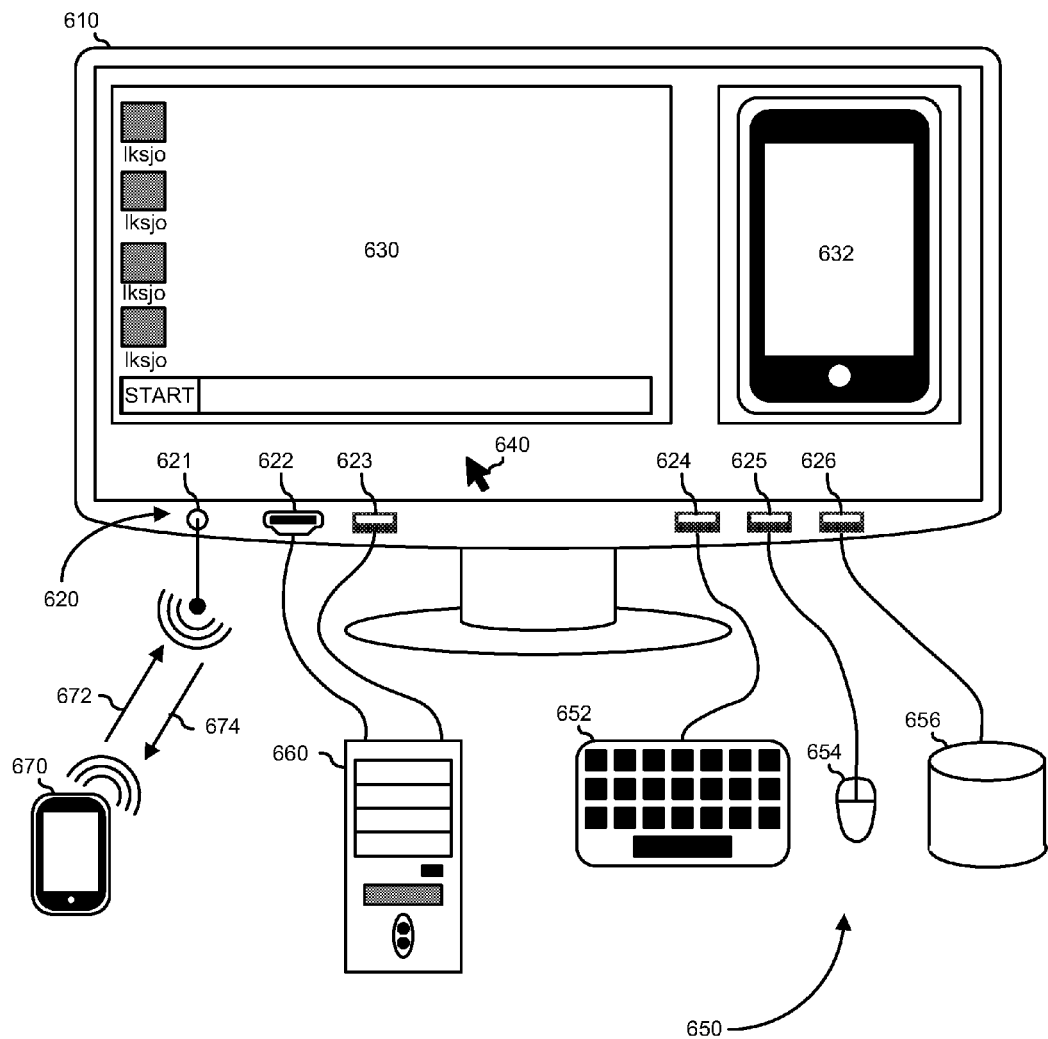
FIG. 6 is a block diagram illustrating a monitor system according to another embodiment of the present disclosure.

FIG. 6 illustrates an embodiment of a monitor system 600 similar to monitor system 100 and including a monitor 610, USB peripheral devices 650, a computer system 660, and a mobile device 670. USB peripheral devices 650 include a keyboard 652, a mouse 654, and a storage device 656. Monitor 610 includes various interfaces 620, including a wireless interface 621, a video interface 622, and USB interfaces 623, 624, 625, and 626. Video interface 622 is similar to video interface 122 and represents an audio/video interface for transferring video content from a host system such as computer system 660 for display on monitor 610. Wireless interface 621 is similar to wireless interface 121 and represents a peer-to-peer wireless network interface for transferring video content from a wireless device such as wireless device 670 for display on monitor 610. Wireless interface 621 is connected to establish a high capacity connection 672 to monitor 610 for transferring the video content, and a backchannel connection 674 from the monitor for receiving information from the monitor.

USB interfaces 623, 624, 625, and 626 are similar to USB interfaces 123, 124, 125, and 126. USB interface 623 is connected to computer system 660 to transfer information between monitor 610 and the computer system. USB interface 624 is connected to keyboard 652 to provide a keyboard-based HID for a selected one of computer system 660 or mobile device 670, as described below. USB interface 625 is connected to mouse 654 to provide a pointer-based HID for a selected one of computer system 660 or mobile device 670, as described below. USB interface 626 is connected to storage device 656 to provide a data storage capacity for a selected one of computer system 660 or mobile device 670, as described below. In a particular embodiment, USB interface 623 operates as an upstream USB port that is connected to computer system 660 and USB interfaces 624, 625, and 626 operate as downstream ports to connect keyboard 652, mouse 654, and storage device 656, respectively, to the computer system.

Monitor 610 operates to display computer content 630 from computer system 660 and to display mobile content 632 from mobile device 670. In a particular embodiment, monitor 610 operates to selectively couple one or more of USB peripheral devices 650 to one of computer system 660 or mobile device 670 based upon an indication from a user as to which of the computer system or the mobile device the user wishes to use. For example, the user can manipulate a pointer 640 to point to one of computer content 630 or mobile content 632. In another example, monitor 610 can include a touch panel feature, and the user can select between computer content 630 and mobile content 632 by touching an area of the touch panel that corresponds with the selected content. In another example, a hot key sequence can be associated with keyboard 652 that operates to select one of computer content 630 or mobile content 632. The skilled artisan will further understand that the teachings of the present disclosure can be applied to multiple input devices to monitor 610, and is not limited to computer system 660 and mobile device 670.

Figure 7:
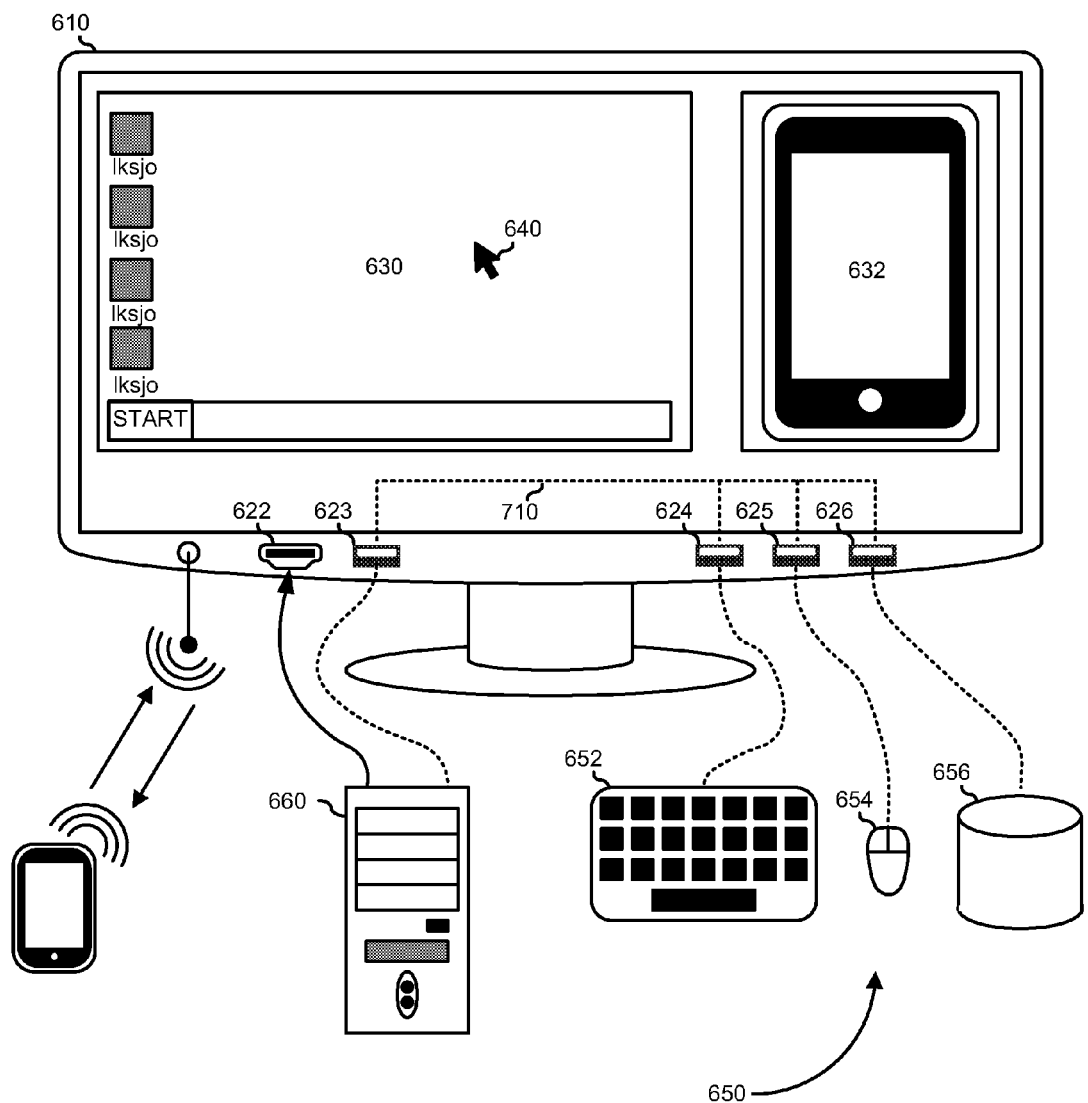
FIGS. 7-8 are block diagrams illustrating embodiments of the monitor system of FIG. 6.

FIG. 7 illustrates a case for monitor system 600 where a user has selected computer content 630, for example, by moving pointer 640 to point to the computer content. Here, in response to the user selection, monitor 610 operates to automatically connect keyboard 652, mouse 654, and storage device 656 to computer system 660, as illustrated by an interconnection 710. In this way, computer system 660 receives the HID functions of keyboard 652 and mouse 654, and has access to the data storage capacity of storage device 656, all via USB interface 623.

Figure 8:
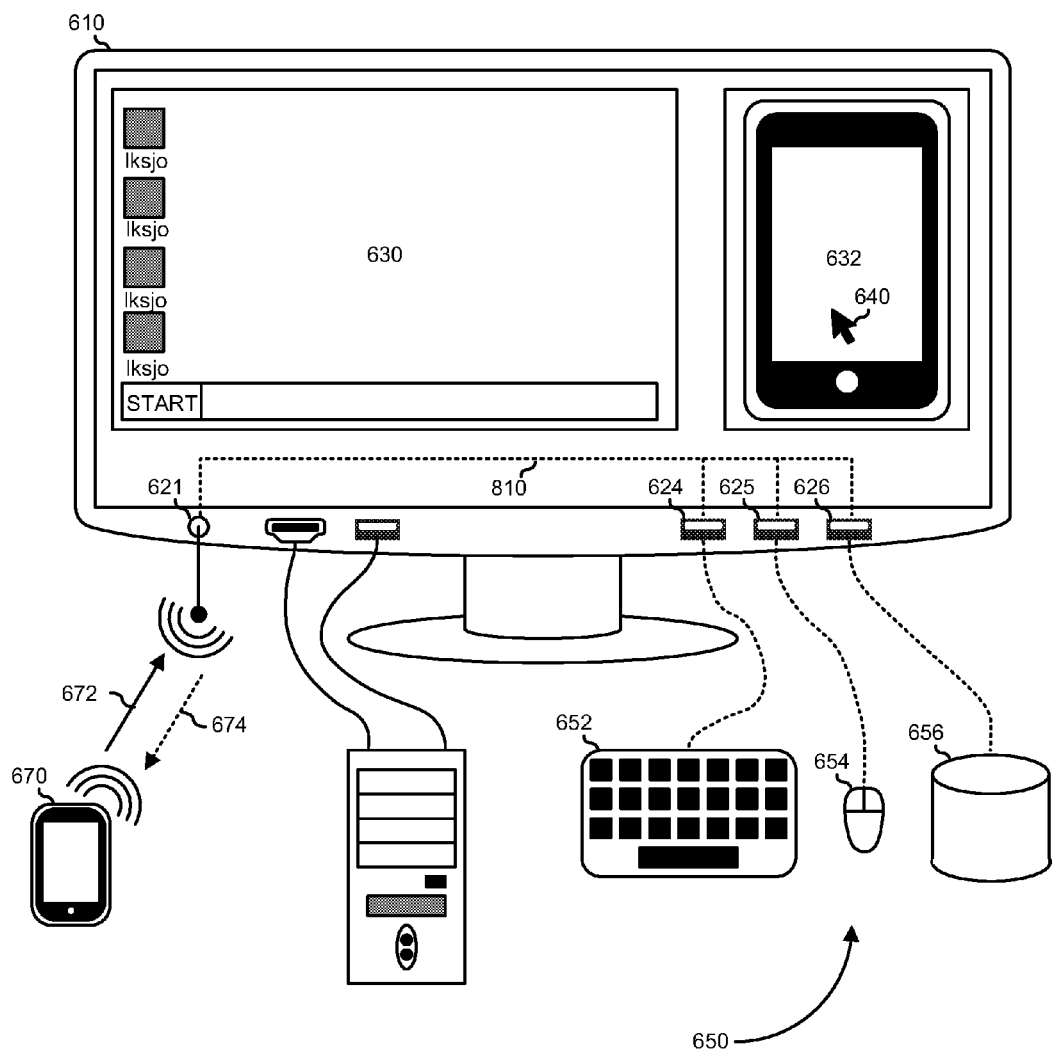

FIG. 8 illustrates a case for monitor system 600 where the user has selected mobile content 632, for example, by moving pointer 640 to point to the mobile content. Here, in response to the user selection, monitor 610 operates to automatically connect keyboard 652, mouse 654, and storage device 656 to mobile device 670, as illustrated by an interconnection 810. In this way, mobile device 670 receives the HID functions of keyboard 652 and mouse 654, and has access to the data storage capacity of storage device 656, all via backchannel connection 674.

Figure 9:
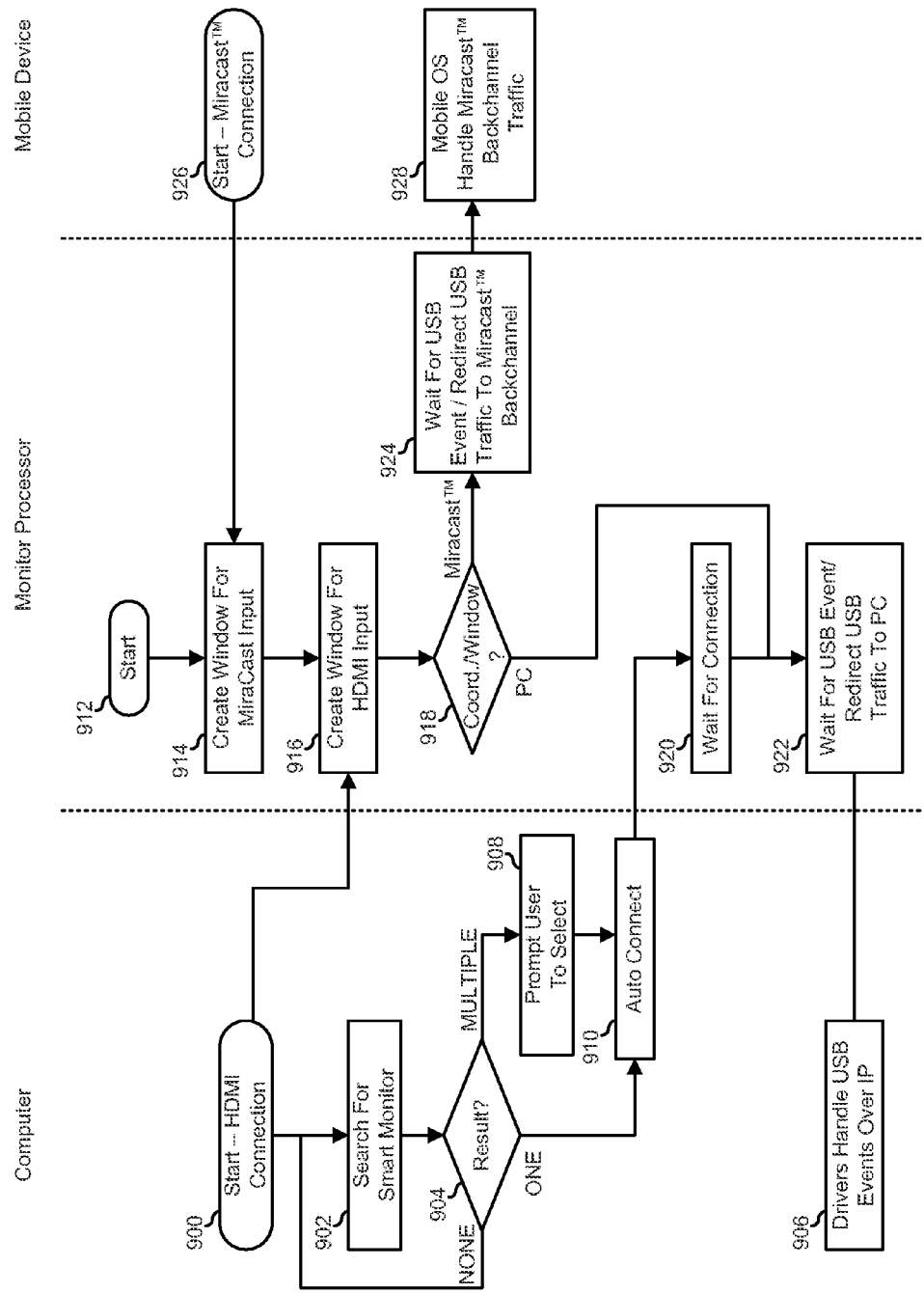
FIG. 9 is a flowchart illustrating a method for seamless switching of USB devices connected to the monitor system of FIG. 6.

FIG. 9 illustrates a method for seamless switching of USB devices in a monitor system similar to monitor system 600. The method is conducted by a computer system similar to computer system 660, a monitor similar to monitor 610, and a mobile device similar to mobile device 670. The method starts in the computer system at block 900. The computer system searches for an attached smart monitor in block 902. In a particular embodiment, the computer system determines if an attached monitor is a smart monitor by receiving EDID information from the attached monitor, and the computer system determines the capabilities of the attached monitor based upon the received EDID information. A decision is made as to whether none, one, or multiple monitors are attached to the computer system in decision block 904. If no monitors are attached to the computer system, the "NONE" branch of decision block 904 is taken and the method returns to block 902 where the computer system searches for an attached smart monitor. If one monitor is attached to the computer system, the "ONE" branch of decision block 904 is taken, the computer system is auto-connected to the one monitor in block 910, and the method proceeds to the steps conducted by the monitor. If multiple monitors are attached to the computer system, the "MULTIPLE" branch of decision block 904 is taken, a user is prompted as to which monitor to attach to the computer system in block 908, the computer system is auto-connected to the one monitor in block 910, and the method proceeds to the steps conducted by the monitor.

The method starts in the mobile device at block 926, where the mobile device establishes a wireless connection to the monitor, such as a WiDi connection or a Miracast connection. The method starts in the monitor at block 912. The monitor creates a window for the wireless device input in block 914 and creates a window for the computer system input in block 916. A decision is made as to which source is selected by a user in decision block 918. For example, a pointer similar to pointer 640 can be used to point to one of the windows for the computer system input or the mobile device input, a monitor can include a touch-panel, and the touch-panel can detect a touch to one of the windows, or another selection method can be utilized. If the computer system is selected, the "COMPUTER" branch of decision block 918 is taken, the monitor processor waits for the computer system to be connected to the monitor in block 920, the monitor processor waits for a USB event and redirects the USB event to the computer in block 922, and the device drivers of the computer system handles the USB event over the USB connection between the monitor and the computer system in block 906. If the mobile device is selected, the "MOBILE" branch of decision block 918 is taken, the monitor processor waits for a USB event and redirects the USB event to the mobile device in block 924, and the mobile OS of the mobile device handles the USB event over the Miracast backchannel or other wireless backchannel in block 928.

Figure 10:
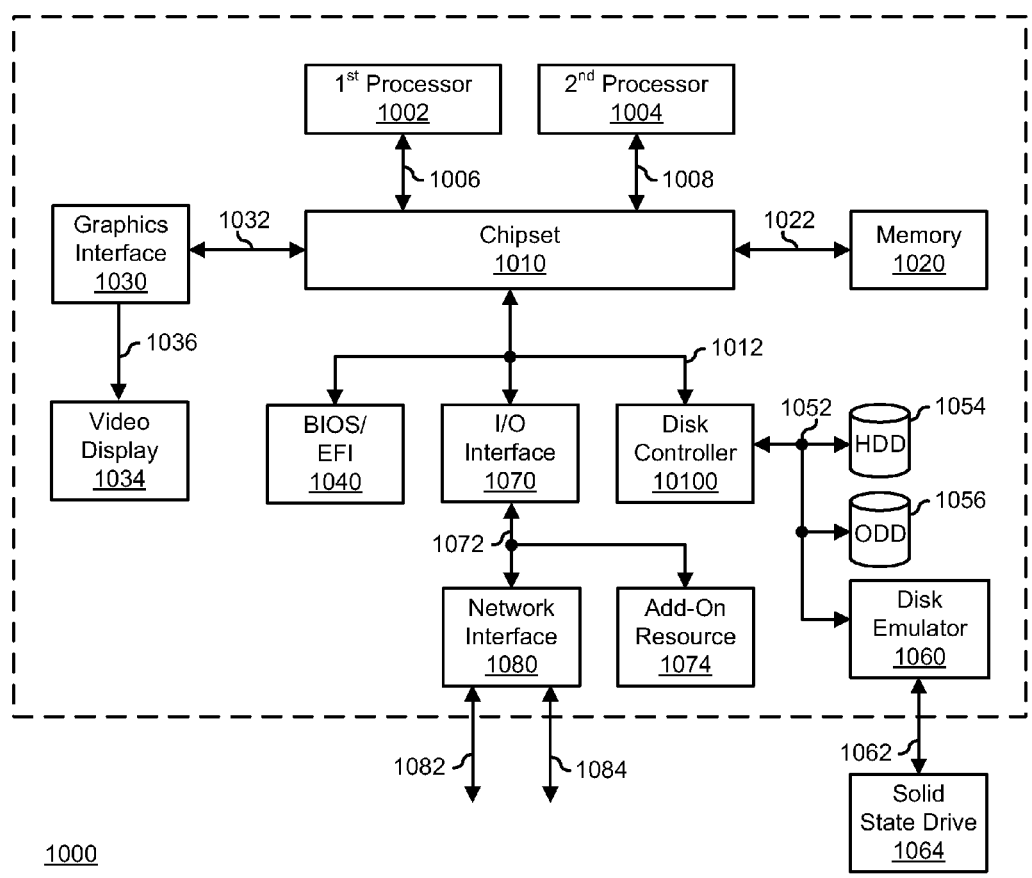
FIG. 10 is a block diagram illustrating a generalized information handling system according to an embodiment of the present disclosure.

FIG. 10 illustrates a generalized embodiment of information handling system 1000. For purpose of this disclosure information handling system 1000 can include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, entertainment, or other purposes. For example, information handling system 100 can be a personal computer, a laptop computer, a smart phone, a tablet device or other consumer electronic device, a network server, a network storage device, a switch router or other network communication device, or any other suitable device and may vary in size, shape, performance, functionality, and price. Further, information handling system 100 can include processing resources for executing machine-executable code, such as a central processing unit (CPU), a programmable logic array (PLA), an embedded device such as a System-on-a-Chip (SoC), or other control logic hardware. Information handling system 1000 can also include one or more computer-readable medium for storing machine-executable code, such as software or data. Additional components of information handling system 1000 can include one or more storage devices that can store machine-executable code, one or more communications ports for communicating with external devices, and various input and output (I/O) devices, such as a keyboard, a mouse, and a video display. Information handling system 1000 can also include one or more buses operable to transmit information between the various hardware components.

Information handling system 1000 can include devices or modules that embody one or more of the devices or modules described above, and operates to perform one or more of the methods described above. Information handling system 1000 includes a processors 1002 and 1004, a chipset 1010, a memory 1020, a graphics interface 1030, include a basic input and output system/extensible firmware interface (BIOS/EFI) module 1040, a disk controller 1050, a disk emulator 1060, an input/output (I/O) interface 1070, and a network interface 1080. Processor 1002 is connected to chipset 1010 via processor interface 1006, and processor 1004 is connected to the chipset via processor interface 1008. Memory 1020 is connected to chipset 1010 via a memory bus 1022. Graphics interface 1030 is connected to chipset 1010 via a graphics interface 1032, and provides a video display output 1036 to a video display 1034. In a particular embodiment, information handling system 1000 includes separate memories that are dedicated to each of processors 1002 and 1004 via separate memory interfaces. An example of memory 1020 includes random access memory (RAM) such as static RAM (SRAM), dynamic RAM (DRAM), non-volatile RAM (NV-RAM), or the like, read only memory (ROM), another type of memory, or a combination thereof.

BIOS/EFI module 1040, disk controller 1050, and I/O interface 1070 are connected to chipset 1010 via an I/O channel 1012. An example of I/O channel 1012 includes a Peripheral Component Interconnect (PCI) interface, a PCI-Extended (PCI-X) interface, a high-speed PCI-Express (PCIe) interface, another industry standard or proprietary communication interface, or a combination thereof. Chipset 1010 can also include one or more other I/O interfaces, including an Industry Standard Architecture (ISA) interface, a Small Computer Serial Interface (SCSI) interface, an Inter-Integrated Circuit ($I^2C$) interface, a System Packet Interface (SPI), a Universal Serial Bus (USB), another interface, or a combination thereof. BIOS/EFI module 1040 includes BIOS/EFI code operable to detect resources within information handling system 1000, to provide drivers for the resources, initialize the resources, and access the resources. BIOS/EFI module 1040 includes code that operates to detect resources within information handling system 1000, to provide drivers for the resources, to initialize the resources, and to access the resources.

Disk controller 1050 includes a disk interface 1052 that connects the disc controller to a hard disk drive (HDD) 1054, to an optical disk drive (ODD) 1056, and to disk emulator 1060. An example of disk interface 1052 includes an Integrated Drive Electronics (IDE) interface, an Advanced Technology Attachment (ATA) such as a parallel ATA (PATA) interface or a serial ATA (SATA) interface, a SCSI interface, a USB interface, a proprietary interface, or a combination thereof. Disk emulator 1060 permits a solid-state drive 1064 to be connected to information handling system 1000 via an external interface 1062. An example of external interface 1062 includes a USB interface, an IEEE 1394 (Firewire) interface, a proprietary interface, or a combination thereof. Alternatively, solid-state drive 1064 can be disposed within information handling system 1000.

I/O interface 1070 includes a peripheral interface 1072 that connects the I/O interface to an add-on resource 1074 and to network interface 1080. Peripheral interface 1072 can be the same type of interface as I/O channel 1012, or can be a different type of interface. As such, I/O interface 1070 extends the capacity of I/O channel 1012 when peripheral interface 1072 and the I/O channel are of the same type, and the I/O interface translates information from a format suitable to the I/O channel to a format suitable to the peripheral channel 1072 when they are of a different type. Add-on resource 1074 can include a data storage system, an additional graphics interface, a network interface card (NIC), a sound/video processing card, another add-on resource, or a combination thereof. Add-on resource 1074 can be on a main circuit board, on separate circuit board or add-in card disposed within information handling system 1000, a device that is external to the information handling system, or a combination thereof.

Network interface 1080 represents a NIC disposed within information handling system 1000, on a main circuit board of the information handling system, integrated onto another component such as chipset 1010, in another suitable location, or a combination thereof. Network interface device 1080 includes network channels 1082 and 1084 that provide interfaces to devices that are external to information handling system 1000. In a particular embodiment, network channels 1082 and 1084 are of a different type than peripheral channel 1072 and network interface 1080 translates information from a format suitable to the peripheral channel to a format suitable to external devices. An example of network channels 1082 and 1084 includes InfiniBand channels, Fibre Channel channels, Gigabit Ethernet channels, proprietary channel architectures, or a combination thereof. Network channels 1082 and 1084 can be connected to external network resources (not illustrated). The network resource can include another information handling system, a data storage system, another network, a grid management system, another suitable resource, or a combination thereof.

Although only a few exemplary embodiments have been described in detail herein, those skilled in the art will readily appreciate that many modifications are possible in the exemplary embodiments without materially departing from the novel teachings and advantages of the embodiments of the present disclosure. Accordingly, all such modifications are intended to be included within the scope of the embodiments of the present disclosure as defined in the following claims. In the claims, means-plus-function clauses are intended to cover the structures described herein as performing the recited function and not only structural equivalents, but also equivalent structures.

The above-disclosed subject matter is to be considered illustrative, and not restrictive, and the appended claims are intended to cover any and all such modifications, enhancements, and other embodiments that fall within the scope of the present invention. Thus, to the maximum extent allowed by law, the scope of the present invention is to be determined by the broadest permissible interpretation of the following claims and their equivalents, and shall not be restricted or limited by the foregoing detailed description.

What is claimed is:

1. A monitor for an information handling system, the monitor comprising:
   a video interface operable to receive first display content;
   a wireless interface operable to receive second display content;
   a first Universal Serial Bus (USB) interface; and
   a second USB interface;
   wherein the monitor is operable to:
      create a first window on a first portion of the monitor and a second window on a second portion of the monitor;
      simultaneously display the first content on the first window and the second content on the second window;
      receive a first selection of the first content;
      couple the first USB interface to the second USB interface in response to receiving the first selection;
      receive a second selection of the second content; and
      couple the wireless interface to the second USB interface in response to receiving the second selection.

2. The monitor of claim 1, further comprising:
   a third USB interface;
   wherein the monitor is further operable to:
      couple the first USB interface to the third USB interface in further response to receiving the first selection; and
      couple the wireless interface to the third USB interface in further response to receiving the second selection.

3. The monitor of claim 1, further comprising:
   a third USB interface;
   wherein the monitor is further operable to couple the first USB interface to the third USB interface in further response to receiving the first selection and to receiving the second selection.

4. The monitor of claim 3, wherein:
   the second USB interface is coupled to a human interface device; and
   the third USB interface is coupled to a storage device.

5. The monitor of claim 1, further comprising:
   a touch-panel;
   wherein the monitor is further operable to receive the first selection and the second selection from the touch-panel.

6. The monitor of claim 1, wherein the wireless interface is operable to:
   establish a wireless connection with a wireless device;
   receive the second display content via the wireless connection; and
   couple the wireless interface to the second USB interface via a backchannel of the wireless connection.

7. The monitor of claim 1, wherein the second USB connection is coupled to a human interface device.

8. A method comprising:
   receiving, at a monitor, first video content from a computer system;
   receiving, at the monitor, second video content from a mobile device;
   creating a first window on a first portion of the monitor;
   creating a second window on a second portion of the monitor;
   displaying the first video content on the first window, and simultaneously displaying the second video content on the second window;
   determining whether a pointer of the monitor is pointing to the first window or to the second window;
   coupling a first Universal Serial Bus (USB) interface of the monitor to a second USB interface of the monitor in response to determining that the pointer is pointing to the first window; and
   coupling a wireless interface of the monitor to the second USB interface in response to determining that the pointer is pointing to the second window.

9. The method of claim 8, further comprising:
   coupling the first USB interface to a third USB interface in further response to determining that the pointer is pointing to the first window; and
   coupling the wireless interface to the third USB interface in response to determining that the pointer is pointing to the second window.

10. The method of claim 8, wherein:
    the second USB interface is coupled to a human interface device; and
    the third USB interface is coupled to a storage device.

11. The method of claim 8, wherein:
    the monitor comprises a touch-panel; and
    determining whether the pointer is pointing to the first window or to the second window is based upon an input from the touch-panel.

12. The method of claim 8, further comprising:
    establishing a wireless connection with a wireless device;
    receiving the second display content via the wireless connection; and
    coupling the wireless interface to the second USB interface via a backchannel of the wireless connection.

13. A non-transitory computer-readable medium including code for performing a method, the method comprising:
    receiving, at a monitor, first video content from a computer system;
    receiving, at the monitor, second video content from a mobile device;
    creating a first window on a first portion of the monitor;
    creating a second window on a second portion of the monitor;
    displaying the first video content on the first window, and simultaneously displaying the second video content on the second window;

determining whether a pointer of the monitor is pointing to the first window or to the second window;

coupling a first Universal Serial Bus (USB) interface of the monitor to a second USB interface of the monitor in response to determining that the pointer is pointing to the first window; and coupling a wireless interface of the monitor to the second USB interface in response to determining that the pointer is pointing to the second window.

14. The computer-readable of claim 13, the method further comprising:

coupling the first USB interface to a third USB interface in further response to determining that the pointer is pointing to the first window; and coupling the wireless interface to the third USB interface in response to determining that the pointer is pointing to the second window.

15. The computer-readable of claim 13, wherein:

the second USB interface is coupled to a human interface device; and the third USB interface is coupled to a storage device.

16. The computer-readable of claim 13, wherein:

the monitor comprises a touch-panel; and determining whether the pointer is pointing to the first window or to the second window is based upon an input from the touch-panel.

17. The computer-readable of claim 13, the method further comprising:

establishing a wireless connection with a wireless device;

receiving the second display content via the wireless connection; and coupling the wireless interface to the second USB interface via a backchannel of the wireless connection.

\* \* \* \* \*